United States Patent [19]

Sakuma et al.

[11] Patent Number: 5,080,208
[45] Date of Patent: Jan. 14, 1992

[54] SHIFT LEVER APPARATUS FOR AUTOMATIC TRANSMISSION OF VEHICLE

[75] Inventors: Hitoshi Sakuma; Tadao Muramatsu, both of Toyota; Shozo Kito; Shoichi Harada, both of Niwa, all of Japan

[73] Assignee: Kabushiki Kaisha Tokai-Rika-Denki-Seisakusho, Aichi, Japan

[21] Appl. No.: 452,386

[22] Filed: Dec. 19, 1989

[30] Foreign Application Priority Data

Dec. 22, 1988 [JP] Japan .................. 63-166042[U]

[51] Int. Cl.$^5$ .............................................. B40K 41/28
[52] U.S. Cl. ...................... 192/4 A; 74/475; 74/483 R
[58] Field of Search ............. 74/473 R, 475, 477, 74/538, 878, 483; 192/4 A, 1; 180/271

[56] References Cited

U.S. PATENT DOCUMENTS

| | | | |
|---|---|---|---|
| 3,757,600 | 9/1973 | Bieber | 74/538 X |
| 3,941,008 | 3/1976 | Cambria | 74/475 X |
| 4,235,123 | 11/1980 | Simancik et al. | 75/537 X |
| 4,880,092 | 11/1989 | Kito et al. | 74/475 X |
| 4,887,702 | 12/1989 | Ratke et al. | 192/4 A |
| 4,905,802 | 3/1990 | Gotoh | 192/4 A |
| 4,909,096 | 3/1990 | Kobayashi | 74/878 X |
| 4,919,242 | 4/1990 | Muramatsu et al. | 74/477 X |
| 4,934,496 | 6/1990 | Barske et al. | 180/271 X |
| 4,936,158 | 6/1990 | Livshits et al. | 74/475 |

FOREIGN PATENT DOCUMENTS 52-51379 11/1977 Japan .
56-77439 11/1981 Japan .
57-14106 3/1982 Japan .

Primary Examiner—Allan D. Herrmann
Assistant Examiner—Winnie Yip
Attorney, Agent, or Firm—Oliff & Berridge

[57] ABSTRACT

A shift lever apparatus for an automatic transmission of a vehicle includes shift positions of which are arranged in the order of a parking range, a reverse range, a neutral range, and a drive range and are selectable in a single shift range by a swinging operation of the shift lever. The apparatus is provided with a control member which is adapted to control the movement of a moving plate caused by the pressing of a detent pin. Control is effected such that even if a pushbutton is pressed, a shifting operation from the parking range to another range is prohibited when the parking range is selected as the shift position and a foot brake of the vehicle is not pressed with the foot. Furthermore, even if the pushbutton is pressed, a shifting operation from the neutral range toward the reverse range is prohibited when a speed of the vehicle is above a predetermined value and a shifting operation is effected to the neutral range.

18 Claims, 8 Drawing Sheets

SHIFT LEVER APPARATUS FOR AUTOMATIC TRANSMISSION OF VEHICLE

BACKGROUND OF THE INVENTION

1. Field of the Invention

The present invention relates to a shift lever for an automatic transmission of an automobile or the like.

2. Description of the Related Art

In a shift lever apparatus for an automobile on which an automatic transmission is mounted, the shift positions of a shift lever are arranged in the order of a parking range, reverse range, neutral range, and drive range, the shift lever being selectable within a single shift range through a shifting operation. In addition, a pushbutton is provided on a knob of the shift lever, and the arrangement is such that the shifting operation can be effected between the neutral range and the drive range irrespective of a pressing operation of the pushbutton, but the shifting operation cannot be effected from the neutral range or the parking range toward the reverse range unless the pushbutton is being pressed. This is because a detent pin, which is connected to the shift lever and is adapted to move substantially horizontally by the shifting operation of the shift lever and move downward by the pressing operation of the pushbutton, is inserted in a detent plate and is thereby restricted from moving.

With this type of shift lever apparatus, an arrangement has been conceived which does not allow the operation of shifting from the parking range toward the reverse range unless the driver steps on a foot brake, so as to prevent an operational error at the time of starting the automobile. For instance, the following arrangement has been conceived: A stopper is provided around the detent pin and is driven by a driving means. If an attempt is made to effect a shifting operation from the parking range toward the reverse range with the foot brake not being pressed with the foot, the stopper is brought into contact with the detent pin which moves downward as the pushbutton is being pressed, so that the downward movement of the detent pin is hampered by the stopper, thereby making it impossible to effect a shifting operation from the parking range toward the reverse range.

In addition, in this type of shift lever apparatus, in order to prevent the shift lever from being shifted from the drive range to the reverse range through the neutral range as the pushbutton is pressed by mistake during driving, an arrangement has been conceived which does not allow the shift lever to be shifted directly from the drive range to the reverse range even if the pushbutton is pressed.

For instance, Japanese Utility Model Application Publication Nos. 51379/1977 and 14106/1982 disclose shift lever apparatuses which are arranged such that a lever is provided swingably around a detent pin, and this lever makes it impossible to effect a shifting operation directly from the drive range to the reverse range. According to these shift lever apparatuses, when the shift lever is shifted from the neutral range toward the reverse range with the pushbutton pressed, the lever provided around the detent pin allows the movement of the detent pin as that lever is pressed and swung by the detent pin which moves downward by the pressing of the pushbutton. However, when an attempt is made to effect a shifting operation directly from the drive range to the reverse range with the pushbutton pressed, the lever is brought into contact with the detent pin which moves substantially horizontally by the swinging operation of the shift lever, thereby hampering the movement of the detent pin. Thus, the shifting operation from the drive range to the reverse range during the running of a vehicle is prevented. In addition, Japanese Utility Model Laid-Open No. 77439/1981 discloses a shift lever apparatus which is adapted to prevent a shifting operation from the drive range to the reverse range during the running of a vehicle. However, according to this shift lever apparatus, the shifting operation from the neutral range to the reverse range cannot be effected unless a pushbutton is pressed strongly, and, conceivably, there are cases where the pushbutton may be pressed strongly during the running of the vehicle. Hence, this arrangement cannot positively prevent the shifting operation from the drive range to the reverse range during the running of the vehicle.

Thus, with the shift lever apparatuses, there have been conceived one which is equipped with the function of preventing an operational error at the time of starting the vehicle and one which is equipped with the function of preventing an operational error during the running of the vehicle. In view of this fact, it is conceivable to combine these two types of shift lever apparatus so that operational errors at the time of starting the vehicle or during its running can be prevented.

In this case, however, since the number of parts disposed around the detent pin becomes numerous, it becomes difficult to dispose the various parts in the limited space around the detent pin. Furthermore, even if the parts are disposed around the detent pin, it becomes necessary to change the operational mode of the shift lever depending on a given situation, so that an inconvenience is imposed on the driver.

SUMMARY OF THE INVENTION

Accordingly, an object of the present invention is to provide a shift lever apparatus for an automatic transmission of a vehicle which is capable of preventing an operational error at the time of starting a vehicle or during its running with an arrangement having a small number of parts used and without any need to change the operational mode of the shift lever, thereby overcoming the abovedescribed drawbacks of the conventional art.

To this end, in accordance with the present invention, there is provided a shift lever apparatus for an automatic transmission of a vehicle in which the shift positions of the shift lever are arranged in the order of a parking range, a reverse range, a neutral range, and a drive range and are selectable in a single shift range by a swinging operation of the shift lever, comprising: a pushbutton provided on a knob of the shift lever; a detent pin which is inserted in the shift lever and is adapted to move in a substantially horizontal direction by a swinging operation of the shift lever and move downward by a pressing operation of the pushbutton; a detent plate in which a detent hole for the detent pin to be inserted therethrough, a cam groove being formed on an inner peripheral upper surface of the detent hole, the detent pin being adapted to engage with the cam groove with the pushbutton not being pressed, the detent plate permitting a shifting operation between the neutral range and the drive range irrespective of the pressing operation of the pushbutton, but prohibiting a shifting operation between the neutral range and the parking range unless the pushbutton is pressed; a moving plate which is disposed below the detent pin and along the detent plate and includes a first end face which extends in a substantially horizontal direction and opposes the detent pin in a vertical direction when the parking range is selected as the shift position and a second end surface which extends in a substantially vertical direction and opposes the detent pin when the drive range is selected as the shift position and the pushbutton is pressed, the moving plate being adapted to move by being pressed by the detent pin which moves downward by being brought into contact with the first end surface when the parking range is selected as the shift position and the pushbutton is pressed, the moving plate being also adapted to move by being pressed the detent pin which moves in a substantially horizontal direction by being brought into contact with the second end surface when a shifting operation is effected from the drive range toward the reverse range with the pushbutton pressed; and a control member which is adapted to control the movement of the moving plate caused by the pressing of the detent pin such that even if the pushbutton is pressed, a shifting operation from the parking range to another range is prohibited when the parking range is selected as the shift position and a foot brake of the vehicle is not pressed with the foot, and even if said pushbutton is pressed, a shifting operation from the neutral range toward the reverse range is prohibited when a vehicle speed is above a predetermined value and a shifting operation is effected to the neutral range.

In accordance with the above-described invention, in the so-called standstill state of the vehicle in which the parking range has been selected as the shift position and the foot brake is not being pressed with the foot, the movement of the moving plate through the pressing by the detent pin is controlled by the control member, thereby prohibiting a shifting operation from the parking range toward the reverse range. In other words, if an attempt is made to shift from the parking range toward the reverse range with the pushbutton pressed, the detent pin which moves downwardly is brought into the first end surface of the moving plate so as to hamper the downward movement of the detent pin, thereby making it impossible to effect the shifting operation from the parking range toward the reverse range.

In this state, if the foot brake is pressed with the foot, the moving plate becomes movable by the pressing of the detent pin, thereby allowing the shifting operation to be performed from the parking range toward the reverse range. In other words, when effecting the shifting operation from the parking range toward the reverse range with the pushbutton pressed, the detent pin which moves down is brought into contact with the first end surface of the moving plate. Subsequently, however, the moving plate moves by being pressed by the detent pin which moves downward, with the result that the downward movement of the detent pin is not hampered. For this reason, it becomes possible to perform the shifting operation from the parking range toward the reverse range.

During the running of the vehicle, when the vehicle speed is above a predetermined level and the shift lever is shifted to the neutral range, the movement of the moving plate through the pressing of the detent pin is controlled by the control member, thereby making it impossible to perform the shifting operation from the neutral range toward the reverse range. In other words, even if an attempt is made to shift from the neutral range toward the reverse range with the pushbutton pressed, the detent pin which moves substantially horizontally is brought into contact with the second end surface of the moving plate, thereby hampering the movement of the detent pin in the substantially horizontal direction. For this reason, even if an attempt is made erroneously to effect a shifting operation from the drive range toward the reverse range with the pushbutton pressed during the running of the vehicle, the shifting operation from the neutral range toward the reverse range is prohibited.

The above and other objects, features and advantages of the invention will become more apparent from the following detailed description of the invention when read in conjunction with the accompanying drawings.

BRIEF DESCRIPTION OF THE DRAWINGS

FIGS. 1 to 5 illustrate a first embodiment of a shift lever apparatus for an automatic transmission of a vehicle in accordance with the present invention, in which FIG. 1 is a side-elevational view illustrating a state in which a P range has been selected as a shift position;

FIG. 2 is a side-elevational view illustrating a state in which an N range has been selected as the shift position;

FIG. 3 is a top plan view of FIG. 1;

FIG. 4 is a circuit diagram illustrating the operation of a solenoid shown in FIG. 1;

FIG. 5 is a side-elevational view illustrating a state in which an R range has been selected as the shift position;

DESCRIPTION OF THE PREFERRED EMBODIMENTS

FIGS. 1 to 5 illustrate a first embodiment of a shift lever apparatus for an automatic transmission of a vehicle in accordance with the present invention.

In a shift lever apparatus 10, the shift positions of a shift lever 12 are arranged in a longitudinal direction in the order of a parking range (hereinafter referred to as the P range), a reverse range (hereinafter referred to as the R range), a neutral range (hereinafter referred to as the N range), a drive range (hereinafter referred to as the D range), a second range (hereinafter referred to as the 2nd range), and a low range (hereinafter referred to as the L range). It should be noted that the terms "longitudinal" and "longitudinally" referred to herein indicate the direction in which the shift positions are arranged or directions that are parallel thereto.

The shift lever has a lower end portion rotatably supported by an intermediate portion of a shaft with opposite ends supported by an unillustrated pair of brackets suspended from a rear surface of a baseplate 13. The shift lever 12 is swung about the shaft so as to be selectable in a single shift range.

Figure 1:
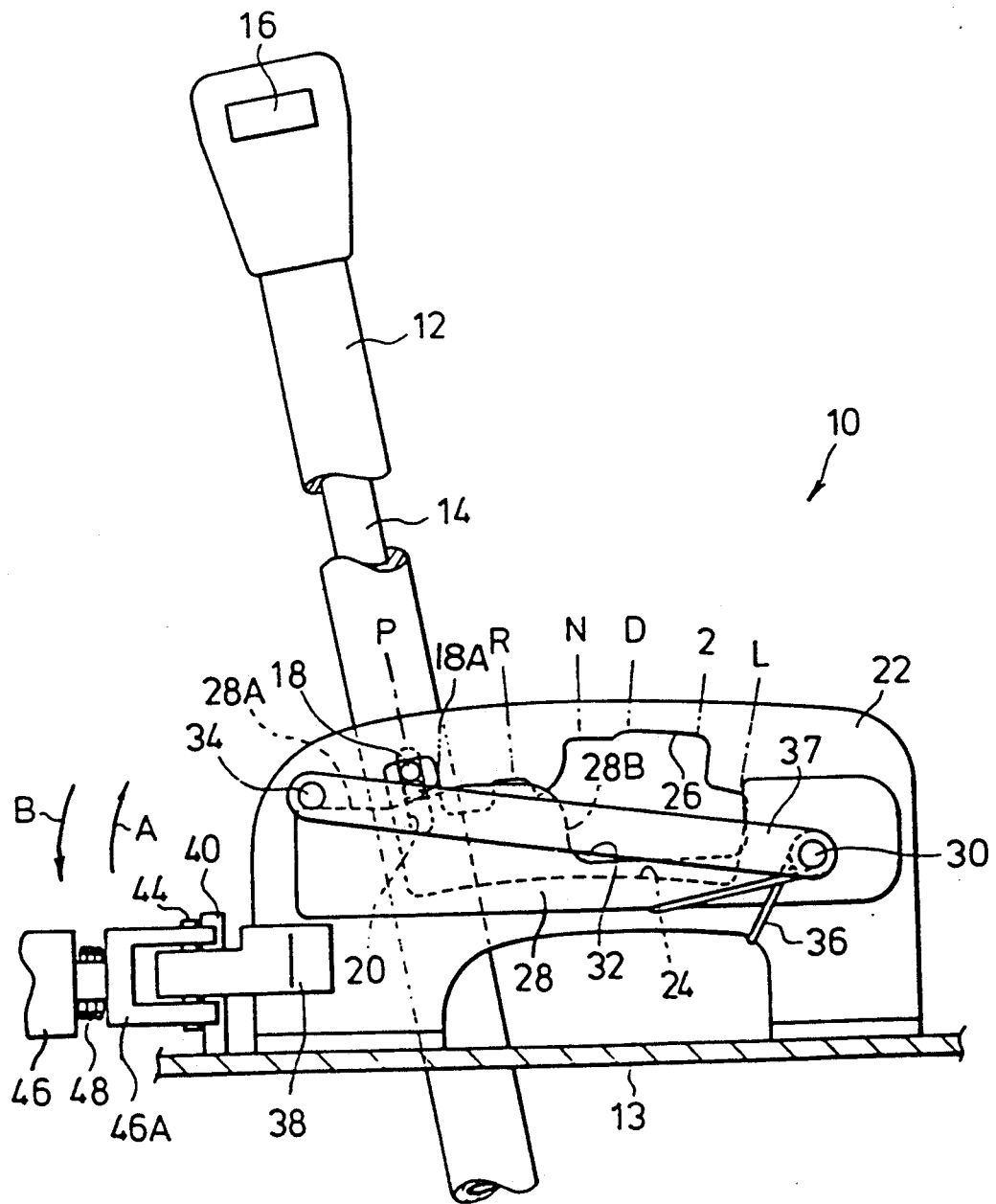
Figure 2:
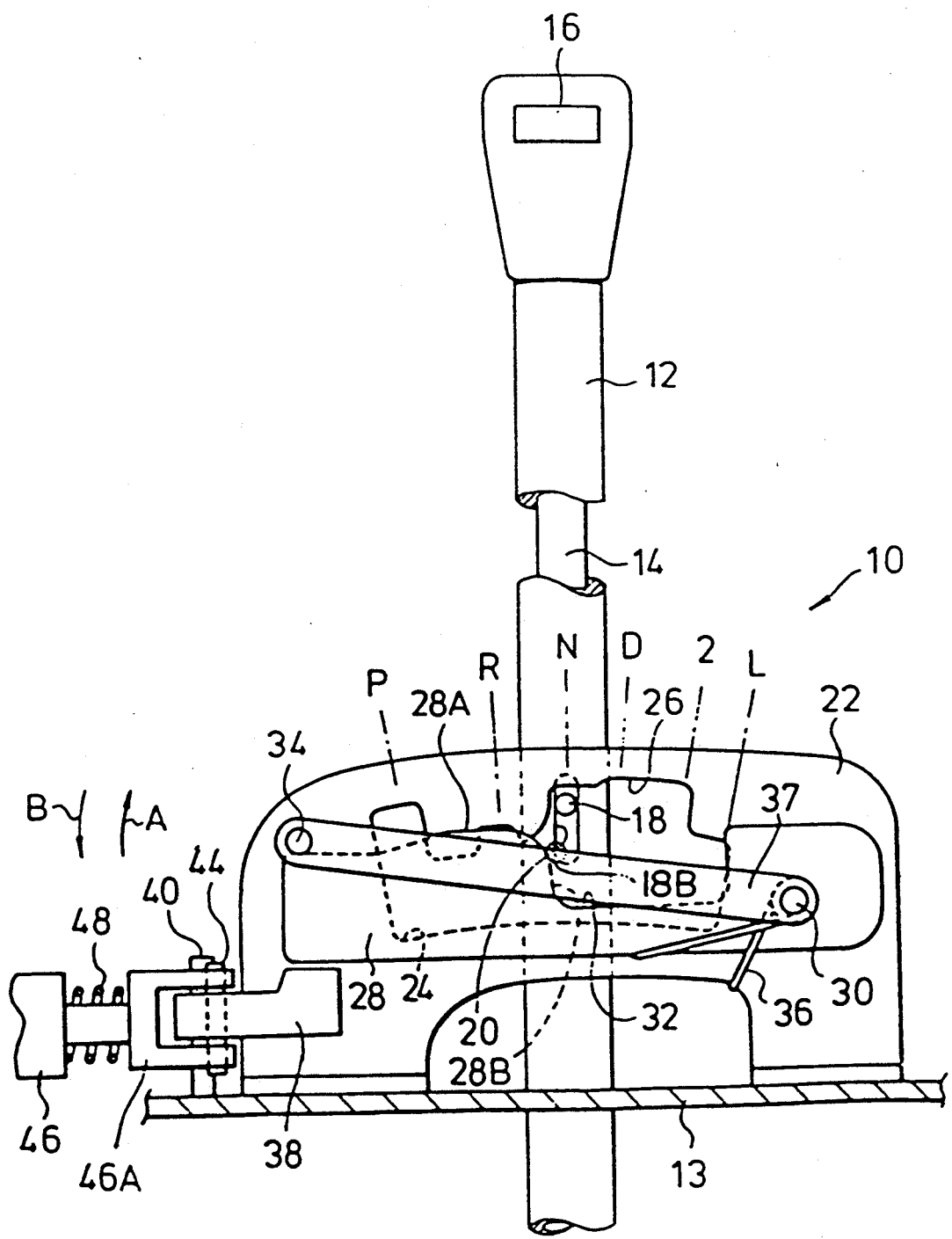

A detent rod 14 is incorporated inside the shift lever 12 in such a manner as to be slidable in an axial direction of the shift lever 12 (vertically as viewed in FIGS. 1 and 2). The detent rod 14 is urged upward by the resiliency of an unillustrated compression spring, and the arrangement is such that the detent rod 14 is pressed downward against the resiliency of the compression spring as a knob pushbutton 16 provided at a distal end of the shift lever 12 is pressed by the driver. A detent pin 18 is secured in a lower end portion of the detent rod 14. This detent pin 18 is adapted to move in the longitudinal direction as the shift lever 12 is swingingly operated and is also adapted to be pressed downward by the pressing operation of the knob pushbutton 16.

The detent pin 18 is disposed by being inserted through an elongated hole 20 formed in the shift lever 12, and its end portion projects outside the shift lever 12, a detent plate 22 being disposed therearound by being erected on the baseplate 13.

The detent plate 22 has a detent hole 24 through which the detent pin 18 is inserted. When the shift lever 12 is operated, the detent pin 18 is adapted to move inside the detent hole 24. A cam groove 26 having an uneven surface is formed on an upper inner peripheral surface of the detent hole 24, and in a state in which, when the knob pushbutton is not being pressed, the detent pin 18 is engaged with the cam groove 26 by means of the resiliency of the compression spring. By virtue of this engagement, the movement of the detent pin 18 with the knob pushbutton 16 not being pressed is restricted, thereby restricting the shifting operation. That is, when the P range, for instance, is selected as the shift position, the shift lever 12 is made unswingable by the engagement of the detent pin 18 with the cam groove 26, and the operation of shifting from the P range to the R range cannot be effected unless the knob pushbutton 16 is pressed to move the detent pin 18 downward. In a similar manner, unless the knob pushbutton 16 is pressed, the operation of shifting from the R range to the P or N range, from the N range to the R range, or from the 2nd range to the L range is prevented. However, the shifting operation from the L range to the 2nd range, or from the 2nd range to the N range can be accomplished by the swinging operation of the shift lever 12 irrespective of the pressing operation of the knob pushbutton 16.

A lever 28, which is a moving plate, is disposed below this detent pin 18 and along the detent plate 22.

The lever 28 extends in such a manner as to be longer in the longitudinal direction than the detent hole 24 so that its upper end surface opposes the detent pin 18 in whatever position the detent pin 18 is. A right end portion, as viewed in FIGS. 1 and 2, of the lever 28 is pivotally supported by the detent plate 22 via a pin 30 on the right-hand side of the detent hole 24 so as to be rotatable about the pin 30. A substantially rectangular notch 32 is formed at an upper end of a longitudinally intermediate portion of the lever 28. The arrangement is such that when the P range is selected as the shift position, an upper end surface 28A of a leftward end, which is a first end surface, is vertically opposed to the detent pin 18. However, when the shift position is selectively set between the D range and the L range with the knob pushbutton 16 pressed, an inner peripheral leftward end surface 28B of the notch 32, which is a second end surface, is opposed to the detent pin 18 in the longitudinal direction.

A stopper pin 34 is disposed on an upper portion of a leftward end portion of the lever 28, while a torsion coil spring 36 wound around the pin 30 is disposed on the rightward end side of the lever 28. Furthermore, a stopper block 38, which is a control member, is disposed below the leftward end portion of the lever 28.

The stopper pin 34 is secured to the detent plate 22. This stopper pin 34 is opposed to the upper end surface 28A of the leftward end portion of the lever 28 and is adapted to restrict the swinging motion of the lever 28 in the direction of arrow A so that the lever 28 will not be brought into contact with the detent pin 18 when the P range, N range, D range, 2nd range, or L range is selected as the shift position and the knob pushbutton 16 is not being pressed.

The torsion coil spring 36 is wound around the pin 30 between the lever 28 and a holding plate 37 which has its opposite ends respectively supported by the stopper pin 34 and the pin 30 and is disposed in such a manner as to be superposed on the lever 28. The torsion coil spring 36 urges the lever 28 in a direction of being brought into contact with the stopper pin 34 (in the direction of arrow A). By virtue of this urging force, when the P range, N range, D range, 2nd range, or L range is selected as the shift position and the knob pushbutton 16 is not being pressed, the lever 28 is held in contact with the stopper pin 34 (see FIGS. 1 and 2). On the other hand, when the R range is selected as the shift position, the lever 28 is held in contact with the detent pin 18 (see FIG. 5). That is, when the R range is selected as the shift position, the lever 28 is brought into contact with the detent pin 18, and is held at a position in which it is swung slightly in the direction of arrow B against the urging force of the torsion coil spring 36, as shown in FIG. 5, shifting from the position in which the lever 28 is held in contact with the stopper pin 34.

As a result, at the time of shifting from the P range to the R range, from the R range to the P range, or from the R range to the N range, when the detent pin 18 is depressed by the pressing operation of the knob pushbutton 16, the detent pin 18 is brought into contact with the upper end surface 28A of the leftward end portion of the lever 28 (in the state of a detent pin 18A shown by a two-dotted chain line in FIG. 1), so that the lever 28 is pressed by the detent pin 18, and a swinging force is thereby imparted to the lever 28 in the direction of arrow B against the urging force of the torsion coil spring 36. On the other hand, at the time of shifting to the R range from the N range, D range, 2nd range, or L range, when the lever 12 is swingingly operated with the knob pushbutton 16 pressed, the detent pin 18 is brought into contact with the inner peripheral leftward end surface 28B of the notch provided in the lever 28 (in the state of a detent pin 18B shown by a two-dotted chain line in FIG. 2), and a swinging force is imparted to the lever 28 in the direction of arrow B against the urging force of the torsion coil spring 36. At the time of shifting to the R range from the N range, D range, 2nd range, or L range, if the shift lever 12 is swingingly operated without pressing the knob pushbutton 16, the detent pin 18 is brought into contact with the cam groove 26, and the detent pin 18 is not brought into contact with the lever 28, so that no swinging force is imparted to the lever 28. In addition, at the time of effecting a shifting operation between the N range and the L range, if the shift lever is swingingly operated with the knob pushbutton 16 pressed, the detent pin 18 moves inside the notch 32 provided in the lever 28 and the detent pin 18 is not brought into contact with the lever 28, so that no swinging force is imparted to the lever 28. It should be noted that the holding plate 37 has a function of preventing the torsion coil spring 36 from coming off, and is adapted to guide the lever 28 during its movement to restrict the movement of the lever 28 in the direction of the thickness thereof.

Figure 3:
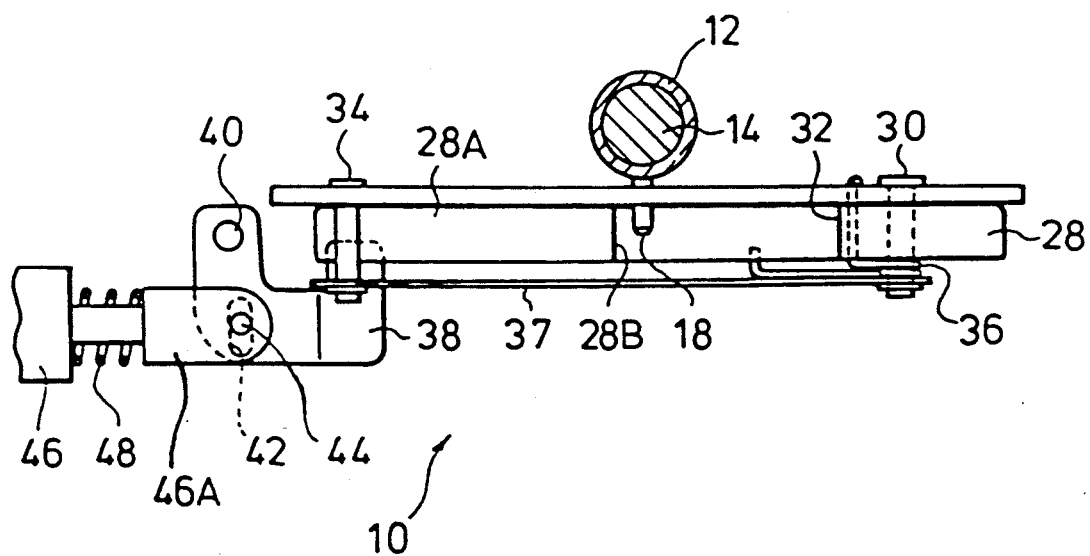

As shown in FIG. 3, the stopper block 38 has an L-shaped configuration in which one side portion is connected to the other side portion at substantially right angles. An end portion of the stopper block 38 on one side portion thereof is rotatably supported by a chassis via a pin 40. The arrangement is such that, at shift positions other than the R range in which the lever 28 is brought into contact with the stopper pin 34, the stopper block 38 is advanced to, or receded from, below the lever 28 as the stopper block 38 swings about the pin 40, thereby making it possible to control the swinging of the lever 28. In other words, in a state in which the stopper block 38 has been advanced to below the lever 28, when the lever 28 is swung against the urging force of the torsion coil spring 36, the lower surface of the leftward end portion of the lever 28 is brought into contact with the stopper block 38, thereby hampering a further swinging of the lever 28 in the direction of arrow B. Meanwhile, in a state in which the stopper block 38 has receded from below the lever 28, the lever 28 is not brought into contact with the stopper block 38, and the swinging of the lever 28 in the direction of arrow B is allowed.

Figure 5:
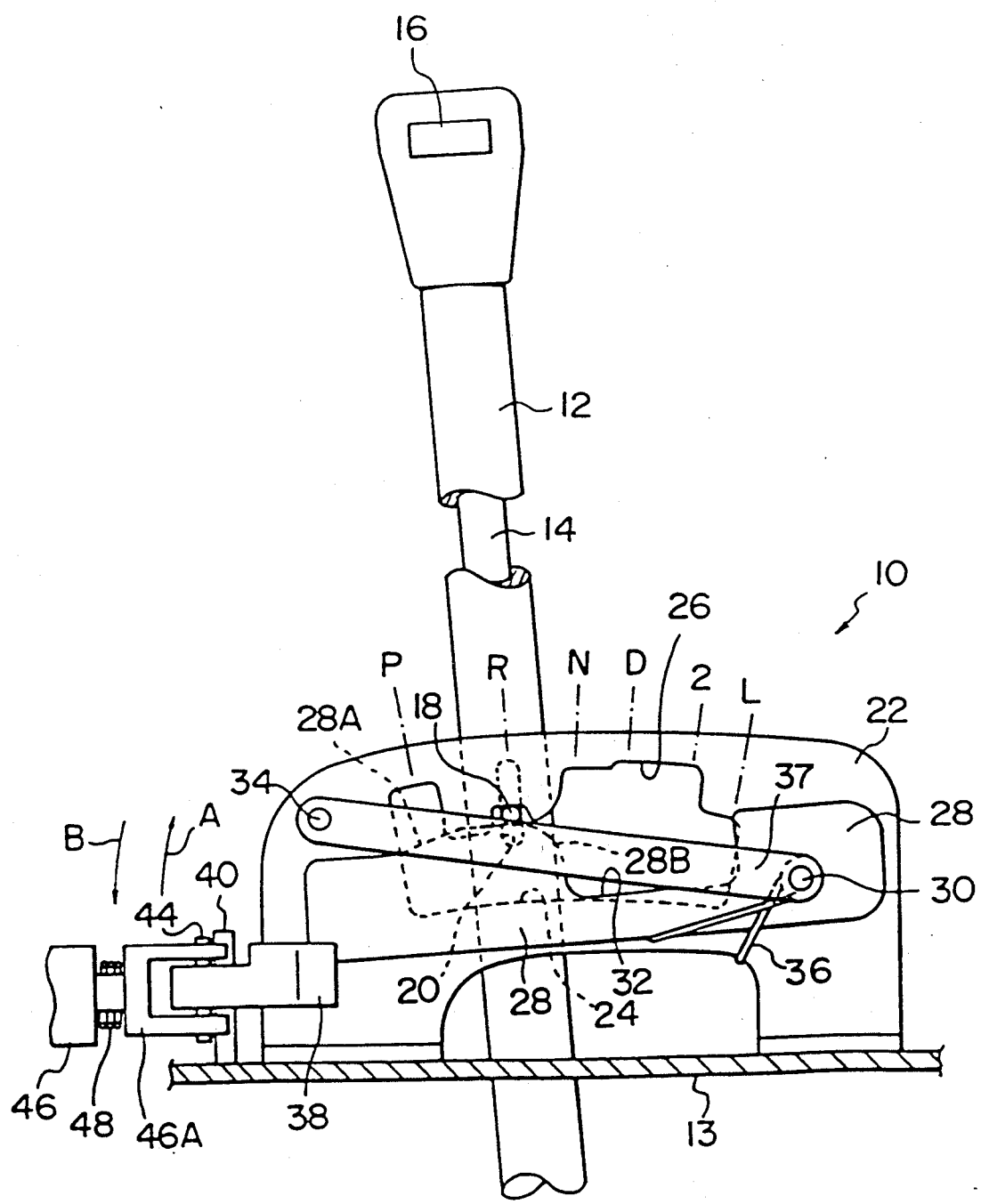

In addition, in a case where the R range has been selected as the shift position, as shown in FIG. 5, the stopper block 38 is adapted to allow the swinging of the lever 28 in the direction of arrow B. In other words, in the state in which the R range has been selected as the shift position, the lever 28 abuts against the detent pin 18 and is held at a position in which the lever 28 is swung slightly in the direction of arrow B, shifting from the position where it abuts against the stopper pin 34, and the stopper block 38 is brought into contact with a side surface of the lever 28 (a front-side surface thereof as viewed in FIG. 5) and is thereby prevented from advancing to below the lever 28. As a result, the movement of the lever 28 in the direction of arrow B is allowed.

A connecting pin 44 is connected to an intermediate portion of the stopper block 38 through an elongated hole 42, and the stopper block 38 is connected to a plunger 46A of a solenoid 46 via the connecting pin 44.

In a nonenergized state, the solenoid 46 urges the stopper block 38 in the direction of advancing the same to below the lever 28 by means of a compression coil spring 48, so that the stopper block 38 can be advanced to below the lever 28. In addition, the solenoid 46, when energized, is adapted to swing the stopper block 38 in the direction of allowing the same to recede from below the lever 28, so that the stopper block 38 can recede from below the lever 28.

The solenoid 46 is energized when the P range has been selected as the shift position, and foot brake has been pressed with the foot, or when the vehicle speed is below a predetermined value and the N range has been selected as the shift position.

Figure 4:
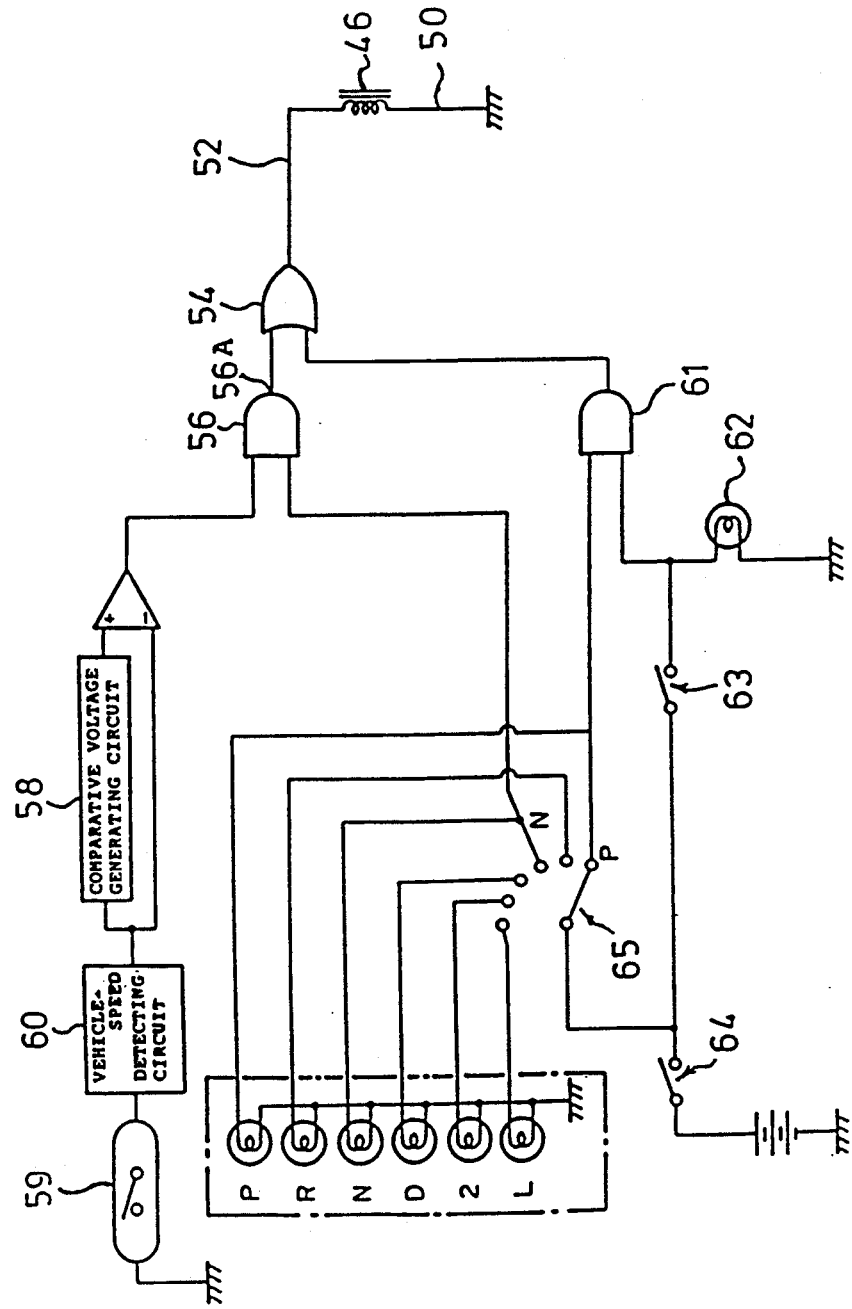

More specifically, as shown in FIG. 4, the solenoid 46 has one power supply line 50 grounded and the other power supply line 52 connected to an output terminal of an OR circuit 54. One input terminal of the OR circuit 54 is connected to an output terminal 56A of an AND circuit 56.

One input terminal of the AND circuit 56 is connected via a comparative voltage generating circuit 58 to an output terminal of a vehicle speed detecting circuit 60 connected to a vehicle speed sensor 59. A vehicle speed signal and a reference signal corresponding to a predetermined vehicle speed are respectively inputted to the comparative voltage generating circuit 58, and a signal is inputted to the AND circuit 56 when the value of the vehicle signal is determined to be lower than the value of the reference signal. In this embodiment, a signal is inputted to one input terminal of the AND circuit 56 when the vehicle speed is 30 km/h or below during acceleration and 10 km/h or below during deceleration.

The other input terminal of the AND circuit 56 is connected to an ignition switch 64 via a speed-change position detecting switch 65. The speed-change position detecting switch 65 is used for detecting a shift position, and a signal is adapted to be inputted to the other input terminal of the AND circuit 56 when the N range has been selected as the shift position.

Meanwhile, the other input terminal of the OR circuit 54 is connected to an output terminal of an AND circuit 61. One input terminal of the AND circuit 61 is connected to the ignition switch 64 via a stop lamp switch 63 which allows current to flow to a stop lamp 62 which is lit when the foot brake is pressed with the foot.

The other input terminal of the AND circuit 61 is connected to the speed-change position detecting switch 65, and a signal is inputted thereto when the P range is selected as the shift position.

The operation of this embodiment will be described hereinunder.

At the time of starting the vehicle, the engine is normally started with the P range selected as the shift position (see FIG. 1).

After starting the engine, in the state in which the foot brake has not been pressed with the foot, since the stop lamp switch 63 is off, a signal is not inputted to the input terminal of the OR circuit through the AND circuit 61. In addition, since the P range has been selected as the shift position, a signal is not inputted to the input terminal of the OR circuit 54 through the AND circuit 56. For this reason, the solenoid 46 is not energized, and the stopper block 38 is set in a state in which it is advanced to below the lever 28 by means of the urging force of the compression coil spring 48, thereby making it impossible for the lever 28 to swing in the direction of arrow B and hampering a shift from the P range to the R range. In other words, if the knob pushbutton 16 is pressed so as to effect a shifting operation from the P range toward the R range, the detent pin 18 is brought into contact with the upper end surface 28A of the leftward end portion of the lever 28 (in the state of the detent pin 18A in FIG. 1), thereby hampering the downward movement of the detent pin 18. As a result, it is impossible to effect a swinging operation of the shift lever 12, making it impossible to shift the lever from the P range toward the R range.

If, in this state, the foot brake is pressed with the foot, the stop lamp switch 63 is turned on, and a signal is inputted to the input terminal of the OR circuit 54 through the AND circuit 61. As a result, the solenoid 46 is energized, and the stopper block 38 recedes from below the lever 28 (the state shown in FIG. 1) so as to allow the lever 28 to be swingable in the direction of arrow B, thereby making it possible to effect the shifting operation from the P range toward the R range. In other words, if the knob pushbutton 16 is pressed to effect the shifting operation from the P range toward the R range, the detent pin 18 is brought into contact with the upper end surface 28A of the leftward end portion of the lever 28 (in the state of the detent pin 18A in FIG. 1). Subsequently, the lever 28 swings in the direction of arrow B by being pressed by the detent pin 18, so that the downward movement of the detent pin 18 is not hampered. For this reason, it becomes possible to swingingly operate the shift lever 12 to shift from the P range to the R range, D range, 2nd range, or L range, thereby making it possible to start the vehicle.

Since at the time of starting the vehicle the R range, D range, 2nd range, or L range is selected as the shift position, a signal is not input to the input terminal of the OR circuit 54 through the AND circuit 61 or the AND circuit 56. As a result, the solenoid 46 is not energized, and when any of the D range, 2nd range, and L range has been selected as the shift position, the stopper block 38 is set in the state in which it is advanced to below the lever 28 by means of the urging force of the compression coil spring 48, so that the swinging of the lever 28 in the direction of arrow B is hampered by the stopper block 38. In addition, when the R range has been selected as the shift position, as shown in FIG. 5, the stopper block 38 is brought into contact with the side surface of the lever 28 (the front side as viewed in FIG. 5) and does not advance to below the lever 28, so that the swinging of the lever 28 in the direction of arrow B is not hampered. In other words, in the state in which any of the D range, 2nd range, or L range has been selected as the shift position, the lever 28 is held in the position in which it is brought into contact with the stopper pin 34, and the stopper block 38 advances to below the lever 28 by means of the urging force of the compression coil spring 48. However, in the state in which the R range has been selected as the shift position, the lever 28 is brought into contact with the detent pin 18 and is held at the position in which it is swung slightly in the direction of arrow B, shifting from the position in which it is brought into contact with the stopper pin 34. As a result, the stopper block 38 is brought into contact with the side surface of the lever 28 and does not advance to below the lever 28. Hence, it becomes possible to effect a shifting operation from the R range to other range. It should be noted that when shifting between the D range and the L range, the detent pin 18 is not brought into contact with the lever 28, so that the lever 28 does not hamper the shifting operation.

When the vehicle is accelerated during running and the N range is selected as the shift position at a vehicle speed of 30 km/h or less (see FIG. 2), a signal is inputted to one input terminal of the OR circuit 54 through the AND circuit 56. As a result, the solenoid 46 is energized, and the stopper block 38 recedes from below the lever 28, thereby making the lever 28 to be swingable in the direction of arrow B. Meanwhile, when the vehicle speed is 30 km/h or above, even if the shift lever is set to the N range, the signal is not inputted to the input terminal of the OR circuit 54 through the AND circuit 56, and the energization of the solenoid 46 is shut off. Hence, the stopper block 38 assumes the state in which it is advanced to below the lever 28 (the state illustrated in FIGS. 2 and 3), thereby making it impossible for the lever 28 to swing in the direction of arrow B.

Accordingly when the vehicle speed is accelerated and exceeds 30 km/h, even if the knob pushbutton 16 is pressed, it becomes impossible to shift to the R range or the P range. In other words, when shifting, for instance, from the D range to the R range with the knob pushbutton 16 pressed, the N range is temporarily selected as the shift position, and at this time the lever 28 cannot swing in the direction of arrow B. In consequence, even if an attempt is made to shift to the R range, the detent pin 18 is brought into contact with the inner peripheral leftward end surface 28B of the notch provided in the lever 28 (in the state of the detent pin 18B in FIG. 2), thereby hampering the movement of the detent pin 18. As a result, it becomes impossible to swingingly operate the shift lever 12 in the N range toward the R range, making it impossible to effect a shifting operation to the R or P range.

When the vehicle speed is decelerated during running and drops to 10 km/h or below, and in this state the N range is selected as the shift position (see FIG. 2), the signal is inputted to one input terminal of the OR circuit 54 through the AND circuit 56. As a result, the solenoid 46 is energized and causes the stopper block 38 to recede from below the lever 28, so that the lever 28 is made swingable by this movement, thereby making it possible to effect the shifting operation toward the R range. That is, when shifting from the N range to the R range, after the knob pushbutton 16 is pressed and the shift lever 12 is then swingingly operated, the detent pin 18 is brought into contact with the inner peripheral leftward end surface 28B of the notch provided in the lever 28 (in the state of the detent pin 18B in FIG. 2). Subsequently, however, the lever 28 swings in the direction of arrow B by being pressed by the detent pin 18, with the result that the movement of the detent pin 18 is not hampered. As a result, the shift lever 12 is swingingly operated and its shifting operation to the P or R range is permitted (see FIG. 1).

Thus, in this embodiment, it is possible to prevent an operational error at the time of starting the vehicle or during its running with a simple arrangement having a small number of parts used and without changing the operational mode.

Figure 6:
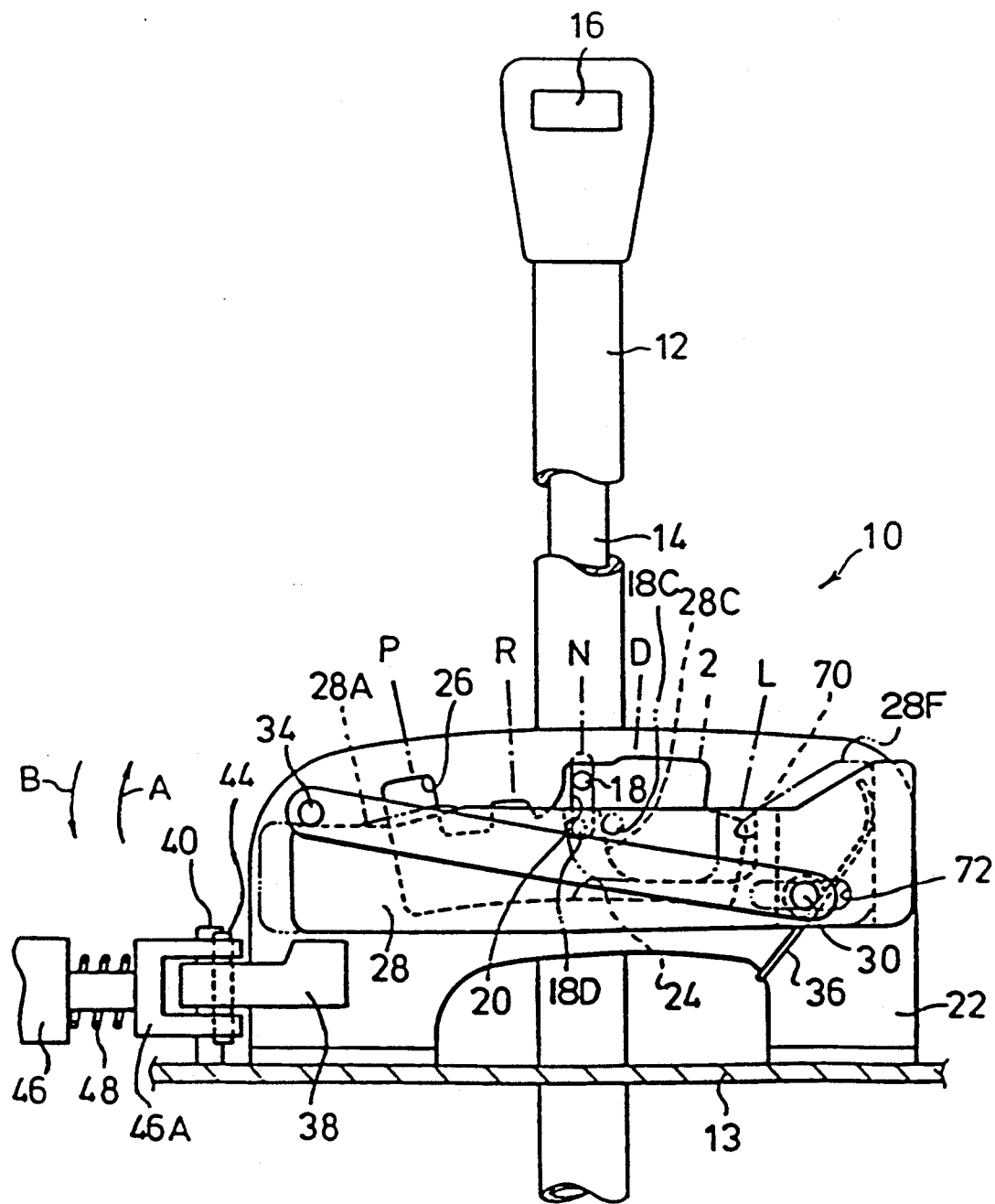
FIG. 6 is a side-elevational view of a second embodiment, corresponding to FIG. 1.
Figure 7:
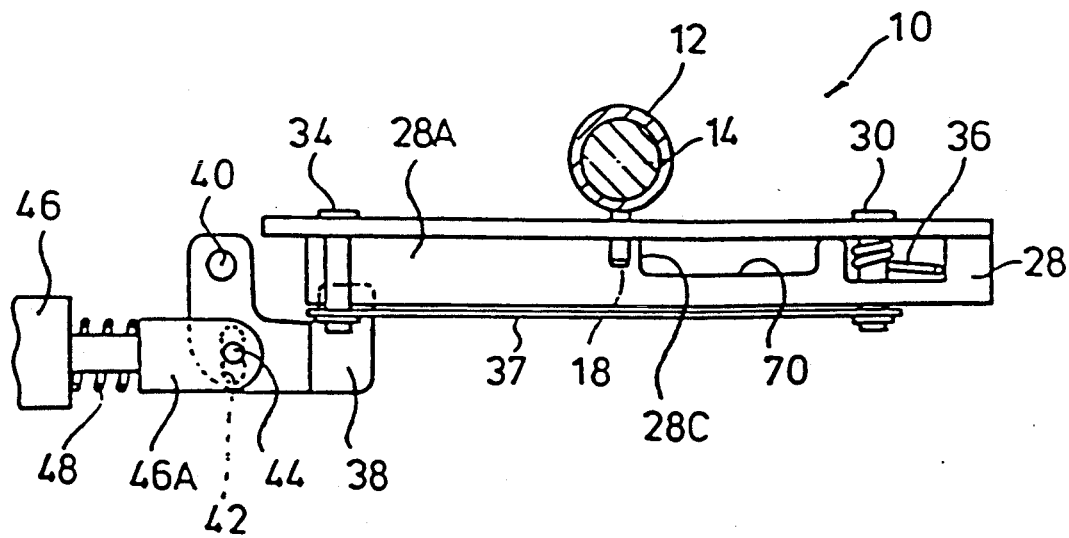
FIG. 7 is a top plan view of the second embodiment, corresponding to FIG. 3.

FIGS. 6 and 7 illustrate a second embodiment of the shift lever apparatus for a vehicle in accordance with the present invention. In this embodiment, the lever 28 has a recessed portion 70 formed in its surface opposing the detent plate 22. The arrangement is such that when the shift position is selectively set between the D range and the L range, and the knob pushbutton 16 is pressed, the detent pin 18 opposes an inner wall 28C on the left-hand side, as viewed in FIG. 6, of the recessed portion 70. In addition, a hole 72 for pivotally supporting the lever 28 by the detent plate 22 is elongated in the longitudinal direction, so that the lever 28 is movable in the longitudinal direction thereof as well. The torsion coil spring 36 is adapted to urge the lever 28 in the rightward direction as well and hold the lever 28 at its rightward limit of movement in the state in which the knob pushbutton is not pressed. Consequently, when the knob pushbutton 16 is pressed and the shifting operation is effected from the D range to the N range, the detent pin 18 is brought into contact with the inner wall 28C of the recessed portion 70 (in the state of a detent pin 18C indicated by a two-dotted chain line in FIG. 6), so that the lever 28 moves leftward by being pressed by the detent pin 18 (in the state of a lever 28F indicated by a two-dotted chain line in FIG. 6).

If the knob pushbutton 16 is pressed and the shift lever 12 is swingingly operated so as to shift to the R range from the D range, 2nd range, or L range, the detent pin 18 is brought into contact with the inner wall 28C of the recessed portion 70 provided in the lever 28 at the time of shifting from the D range to the N range (in the state of the detent pin 18C in FIG. 6), and the lever 28 then moves leftwardly, as indicated by the lever 28F in FIG. 6, by being pressed by the detent pin 18 (because when the D range is selected as the shift position, the energization of the solenoid is shut off, and the swinging of the lever 28 in the direction of arrow B is hampered by the stopper block 38). By means of this movement, the detent pin 18 is moved leftward (a detent pin 18D in FIG. 6), and the N range is selected as the shift position. In this state, the lever 28 is set at its limit of leftward movement. This arrangement is provided to ensure that the shifting operation toward the R range is prevented during the period from the vehicle speed is accelerated and exceeds 30 km/h and until the vehicle speed is decelerated and drops to 10 km/h, i.e., while the energization of the solenoid 46 is being shut off. In other words, when the energization of the solenoid 46 is being shut off, the swinging of the lever 28 in the direction of arrow B is hampered, so that even if an attempt is made to shift toward the R range, the detent pin 18 is brought into contact with the inner wall 28C of the recessed portion 70 of the lever 28. Hence, the leftward movement of the detent pin 18 is hampered, with the result that the shifting operation cannot be effected toward the R range.

When the N range has been selected as the shift position and in the state in which the detent pin 18 is in contact with the inner wall 28C of the recessed portion 70 (in the state of the lever 28F and the detent pin 18D in FIG. 6), if the solenoid 46 is energized, the stopper block 38 recedes from below the lever 28. Hence, the inner wall 28C of the recessed portion 70 is pressed by the detent pin 18 so as to allow the lever 28 to swing in the direction of arrow B, with the result that the shifting operation toward the R range becomes possible by the swinging operation of the shift lever 12. In addition, if the pressing operation of the knob pushbutton 16 is discontinued, the detent pin 18 is moved upward and is dislocated from the recessed portion 70. Concurrently, the lever 28 is returned to its original position by moving rightward by the urging force of the torsion coil spring 36 (in the state illustrated by the solid line in FIG. 5). Thus, in the energized state of the solenoid 46, e.g., when the shifting operation is effected toward the R range with the vehicle at a standstill after deceleration, as the knob pushbutton 16 is pressed, the detent pin 18 is brought into contact with the upper end surface 28A of the lever 28, which in turn causes the lever 28 to swing in the direction of arrow B by being pressed by the detent pin 18, so that the movement of the detent pin 18 is not hampered.

Figure 8:
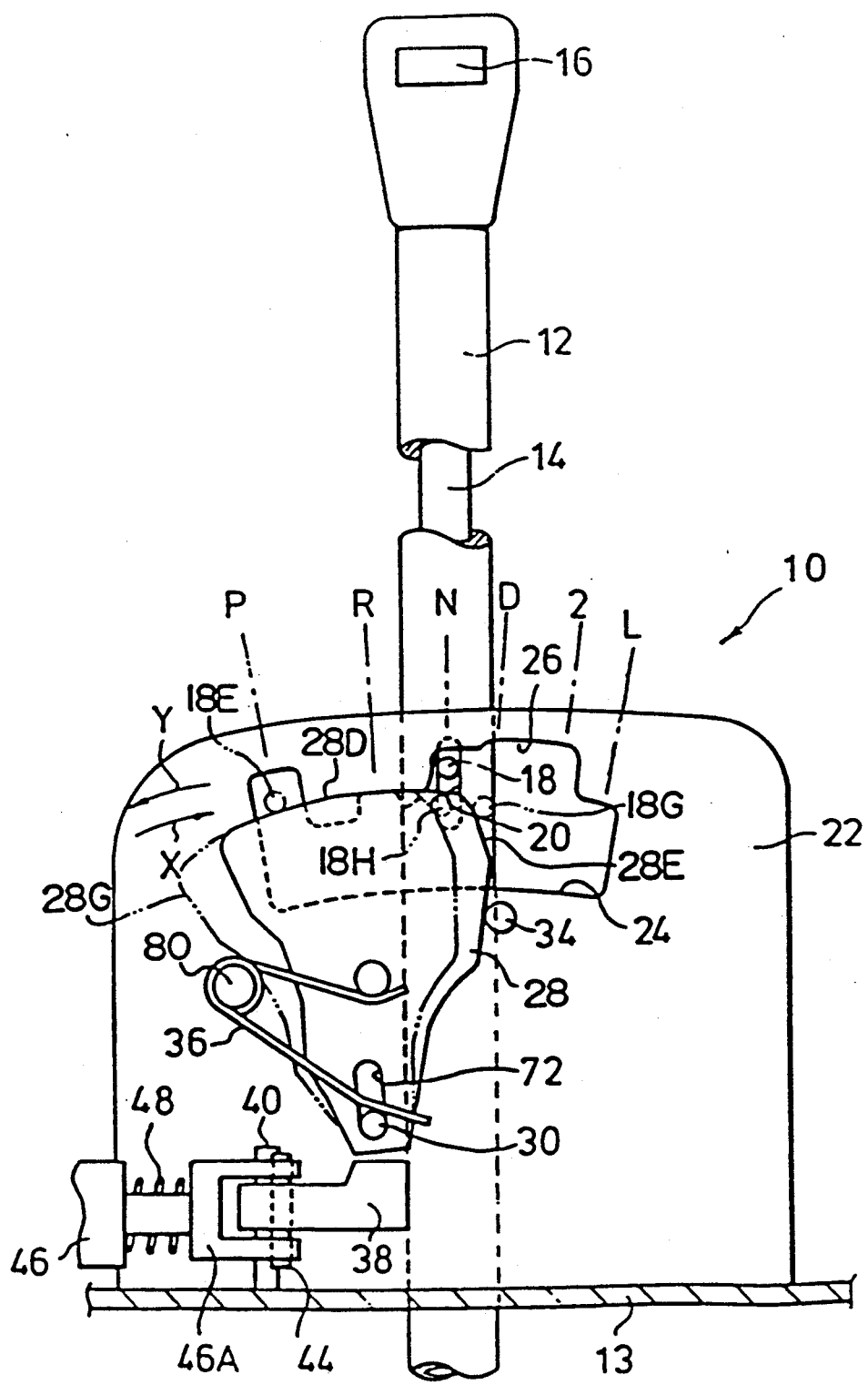
FIG. 8 is a side-elevational view of a third embodiment, corresponding to FIG. 1.

FIG. 8 illustrates a third embodiment of the shift lever apparatus for a vehicle in accordance with the present invention. In this embodiment, the lever 28 is formed in such a manner as to extend vertically, and the lever 28 has its lower end portion supported by the detent plate 22 via the pin 30 below the detent hole 24 in such a manner as to be swingable in the directions of arrows X and Y and vertically movable. The stopper pin 34 is secured to the detent plate 22 at the right-hand side of an upper end portion of the lever 28 and is adapted to restrict the swinging of the lever 28 so that the detent pin 18 will not abut against the upper end portion of the lever 28 during a shifting operation between the N range and the L range. The torsion coil spring 36 is wound around a fixed pin 80 on the right-hand side of the lever 28 and is adapted to urge the lever 28 upward and in the direction of arrow X as well. By means of this urging force, the shift position of the lever 28 other than the R range is selected, and the lever 28 is situated at its limit of upward movement with the knob pushbutton 16 not being pressed, and is held in the state in which it is in contact with the stopper pin 34. When the lever 28 is swung in the direction of arrow Y, the fixed pin 80 is adapted to be brought into contact with the lever 28 and thereby serves as a stopper for the lever 28 (a lever 28G indicated by the two dotted chain line in FIG. 8). In addition, the stopper block 38, when advanced to below the lever 28, is adapted to prevent the downward movement of the lever 28.

With the foot brake pressed by the foot after an engine start, i.e., with the solenoid 46 being energized, if a shifting operation is effected from the P range toward the R range, as the knob pushbutton 16 is pressed, the detent pin 18 is brought into contact with an upper end surface 28D of the lever 28 (in the state of a detent pin 18E), which in turn causes the lever 28 to move downward by being pressed by the detent pin 18, thereby allowing the detent pin 18 to move downward. As a result, it becomes possible to effect the shifting operation from the P range toward the R range with the knob pushbutton 16 pressed. However, in the state in which the foot brake has not been pressed with the foot, i.e., with the energization of the solenoid 46 being shut off, the downward movement of the lever 28 is prevented by the stopper block 38, so that the detent pin 18 is brought into contact with the upper end surface 28D of the lever 28 (in the state of the detent pin 18E) so as to hamper the downward movement of the detent pin 18, thereby making it impossible to effect the shifting operation from the P range toward the R range.

If the shift lever 12 is swingingly operated with the knob pushbutton 16 pressed to effect a shifting operation toward the R range from the D range, 2nd range, or L range, the detent pin 18 is brought into contact with the righthand surface 28E of the upper end portion of the lever 28 (in the state of the detent pin 18G in FIG. 8) during the shifting operation from the D range to the N range. Subsequently, the lever 28 swings in the direction of arrow Y by being pressed by the detent pin 18 (since the lever 28 is urged upward by the torsion coil spring 36). By means of this swinging, the detent pin 18 moves leftward (in the state of a detent pin 18H), allowing the N range to be selected as the shift position. In this state, the lever 28 is brought into contact with the fixed pin 80 and is set at its limit of movement in the direction of arrow Y. This arrangement makes it impossible to effect a shifting operation toward the R range during the period from the time when the vehicle speed is accelerated and exceeds 30 km/h and until the vehicle speed drops to 10 km/h, i.e., while the energization of the solenoid 46 is being shut off. In other words, with the energization of the solenoid 46 being shut off, since the downward movement of the lever 28 is hampered by the stopper block 38, even if an attempt is made to shift toward the R range, the detent pin 18 is brought into contact with the right-hand surface 28E of the upper end portion of the lever 28 so as to prevent the leftward movement of the detent pin 18, thereby making it impossible to effect the shifting operation toward the R range.

With the N range selected as the shift position and in the state in which detent pin 18 is held in contact with the right-hand surface 28E of the upper end portion of the lever 28 (in the state of the lever 28G and the detent pin 18H), if the solenoid 46 is energized, the stopper block 38 recedes from below the lever 28. Consequently, the righthand surface 28E of the upper end portion of the lever 28 is pressed by the detent pin 18, which makes it possible for the lever 28 to be pressed downward, with the result that the shifting operation toward the R range becomes possible by the swinging operation of the shift lever 12. Also, in this state, if the pressing operation of the knob pushbutton 16 is discontinued, the detent pin 18 is moved upward and is dislocated from the right-hand surface 28E of the upper end portion of the lever 28. Concurrently, the lever 28 is swung in the direction of arrow X by the urging force of the torsion coil spring 36 and is hence returned to its original position (in the state illustrated by the solid line in FIG. 8). With the solenoid 46 energized, e.g., at the time of shifting toward the R range with the vehicle at a standstill after deceleration, as the knob pushbutton 16 is pressed, the detent pin 18 is brought into contact with the upper end surface 28D of the lever 28, which in turn causes the lever 28 to be pressed downward by being pressed by the detent pin 18, with the result that the movement of the detent pin 18 is not hampered.

In addition, when the R range has been selected as the shift position, the stopper block 38 is brought into contact with the side surface of the lever 28 (a front-side surface in FIG. 8) and is prevented from advancing to below the lever 28, so that the downward movement of the lever 28 is not hampered. In other words, with any of the D range, 2nd range, or L range being selected as the shift position, the lever 28 is situated at its limit of upper movement, and the stopper block 38 advances to below the lever 28 by the urging force of the compression coil spring 48. However, in the state in which the R range is selected as the shift position, the lever 28 is brought into contact with the detent pin 18 and is held at the position in which it is pressed slightly downwardly below its limit of upward movement, with the result that the stopper block 38 is brought into contact with the side surface of the lever 28 and is prevented from advancing to below the lever 28. Consequently, it becomes possible to effect a shifting operation from the R range to other range.

As described above, the present invention offers an outstanding advantage in that it is capable of preventing operational errors at the time of starting the vehicle or during its running with a simple arrangement having a small number of parts used and without altering the operational mode of the shift lever.

What is claimed is:

1. A shift lever apparatus for an automatic transmission of a vehicle in which the shift positions of said shift lever are arranged in the order of a parking range, a reverse range, a neutral range, and a drive range and are selectable in a single shift range by a swinging operation of said shift lever, comprising:

a pushbutton provided on a knob of said shift lever;
  a detent pin which is inserted in said shift lever and is adapted to move in a substantially horizontal direction by a swinging operation of said shift lever and move downward by a pressing operation of said pushbutton;
  a detent plate having a detent hole for said detent pin to be inserted therethrough, a cam groove being formed on an inner peripheral upper surface of said detent hole, said detent pin being adapted to engage with said cam groove with said pushbutton not being pressed, said detent plate permitting a shifting operation between the neutral range and the drive range irrespective of the pressing operation of said pushbutton, but prohibiting a shifting operation between the neutral range and the parking range unless said pushbutton is pressed;
  a moving plate which is disposed below said detent pin and along said detent plate and includes a first end face which extends in a substantially horizontal direction and opposes said detent pin in a vertical direction when the parking range is selected as the shift position and a second end surface which extends in a substantially vertical direction and opposes said detent pin when the drive range is selected as the shift position and said pushbutton is pressed, said moving plate being adapted to move by being pressed by said detent pin which moves downward by being brought into contact with said first end surface when the parking range is selected as the shift position and said pushbutton is pressed, said moving plate being also adapted to move by being pressed by said detent pin which moves in a substantially horizontal direction by being brought into contact with said second end surface when a shifting operation is effected from the drive range toward the reverse range with said pushbutton pressed; and
  a control member which is movable between a first position and a second position, said first position preventing the movement of said moving plate caused by the pressing of said detent pin such that a shifting operation from the parking range to another range is prohibited when the parking range is selected as the shift position and a foot brake of said vehicle is not pressed with the foot and a shift operation from the neutral range toward the reverse range is prohibited when a speed of the vehicle is above a predetermined value and a shifting operation is effected to the neutral range.

2. A shift lever apparatus for an automatic transmission of a vehicle according to claim 1, wherein said control member is disposed below said moving plate and is arranged to move to said first position on a moving path of said moving plate in which said shifting operation is prohibited and to said second position in which said control member is retreated from the moving path of said moving plate and said shifting operation is permitted.

3. A shift lever apparatus for an automatic transmission of a vehicle according to claim 2, wherein said control member is so arranged that its movement is effected through its swinging motion.

4. A shift lever apparatus for an automatic transmission of a vehicle according to claim 2, further comprising driving means for effecting the movement of said control member.

5. A shift lever apparatus for an automatic transmission of a vehicle according to claim 4, wherein said driving means comprises a solenoid connected to said control member.

6. A shift lever apparatus for an automatic transmission of a vehicle according to claim 5, wherein said control member and said solenoid are connected to each other via a plunger which is advanced or retreated as said solenoid is energized or de-energized.

7. A shift lever apparatus for an automatic transmission of a vehicle according to claim 2, wherein said moving plate is arranged in such a manner that its movement is effected through its swinging motion.

8. A shift lever apparatus for an automatic transmission of a vehicle according to claim 2, wherein said moving plate is arranged in such a manner that its movement via said first end surface is effected through its swinging motion, while its movement via said second end surface is effected through its sliding motion.

9. A shift lever apparatus for an automatic transmission of a vehicle according to claim 2, wherein said moving plate is arranged in such a manner that its movement via said first end surface is effected through its sliding motion, while its movement via said second end surface is effected through its swinging motion.

10. A shift lever apparatus for an automatic transmission of a vehicle in which the shift positions of said shift lever are arranged in the order of a parking range, a reverse range, a neutral range, and a drive range and are selectable in a single shift range by a swinging operation of said shift lever, comprising:
- a pushbutton provided on a knob of said shift lever;
- a detent pin which is inserted in said shift lever and is adapted to move in a substantially horizontal direction by a swinging operation of said shift lever and move downward in the axial direction of said shift lever by a pressing operation of said pushbutton;
- a detent plate having a detent hole for said detent pin to be inserted therethrough, a cam groove being formed on an inner peripheral upper surface of said detent hole, said detent pin being adapted to engage with said cam groove with said pushbutton not being pressed, said detent plate permitting a shifting operation between the neutral range and the drive range irrespective of the pressing operation of said pushbutton, but prohibiting a shifting operation between the neutral range and the parking range unless said pushbutton is pressed;
- a moving plate which is disposed below said detent pin and along said detent plate and includes a first end face which extends in a substantially horizontal direction and opposes said detent pin in a vertical direction when the parking range is selected as the shift position and a second end surface which extends in a substantially vertical direction and opposes said detent pin when the drive range is selected as the shift position and said pushbutton is pressed, said moving plate being adapted to move by being pressed by said detent pin which moves downward by being brought into contact with said first end surface when the parking range is selected as the shift position and said pushbutton is pressed, said moving plate being also adapted to move by being pressed by said detent pin which moves in a substantially horizontal direction by being brought into contact with said second end surface when a shifting operation is effected from the drive range toward the reverse range with said pushbutton pressed;
- a hampering member which is movable between a first position for hampering the movement of said moving plate and a second position for allowing the movement of said moving plate; and
- driving means for moving said hampering member from said second position to said first position so as to position said hampering member in said first position when the parking range is selected as the shift position and a foot brake of said vehicle is not pressed with the foot and when a vehicle speed is above a predetermined value and said shift lever is shifted to the neutral range.

11. A shift lever apparatus for an automatic transmission of a vehicle according to claim 10, wherein said hampering member is disposed below said moving plate, and the movement of said hampering member is effected through its swinging motion.

12. A shift lever apparatus for an automatic transmission of a vehicle according to claim 11, wherein said driving means comprises a solenoid connected to said hampering member.

13. A shift lever apparatus for an automatic transmission of a vehicle according to claim 12, wherein said hampering member and said solenoid are connected to each other via a plunger which is advanced or retreated as said solenoid is energized or de-energized.

14. A shift lever apparatus for an automatic transmission of a vehicle according to claim 11, wherein said moving plate is arranged in such a manner that its movement is effected through its swinging motion.

15. A shift lever apparatus for an automatic transmission of a vehicle according to claim 11, wherein said moving plate is arranged in such a manner that its movement via said first end surface is effected through its swinging motion, while its movement via said second end surface is effected through its sliding motion.

16. A shift lever apparatus for an automatic transmission of a vehicle according to claim 11, wherein said moving plate is arranged in such a manner that its movement via said first end surface is effected through its sliding motion, while its movement via said second end surface is effected through its swinging motion.

17. A shift lever apparatus for an automatic transmission of a vehicle according to claim 11, wherein said second end surface of said moving plate is constituted by a side wall of a recessed portion formed on an upper end surface of said moving plate.

18. A shift lever apparatus for an automatic transmission of a vehicle according to claim 17, wherein said recessed portion has a surface opposing said detent plate.

* * * * *